Sept. 4, 1962 H. EBERT 3,052,098
HYDROSTATIC AXIAL PISTON FLUID TRANSMISSION
Filed Nov. 30, 1960 6 Sheets-Sheet 1
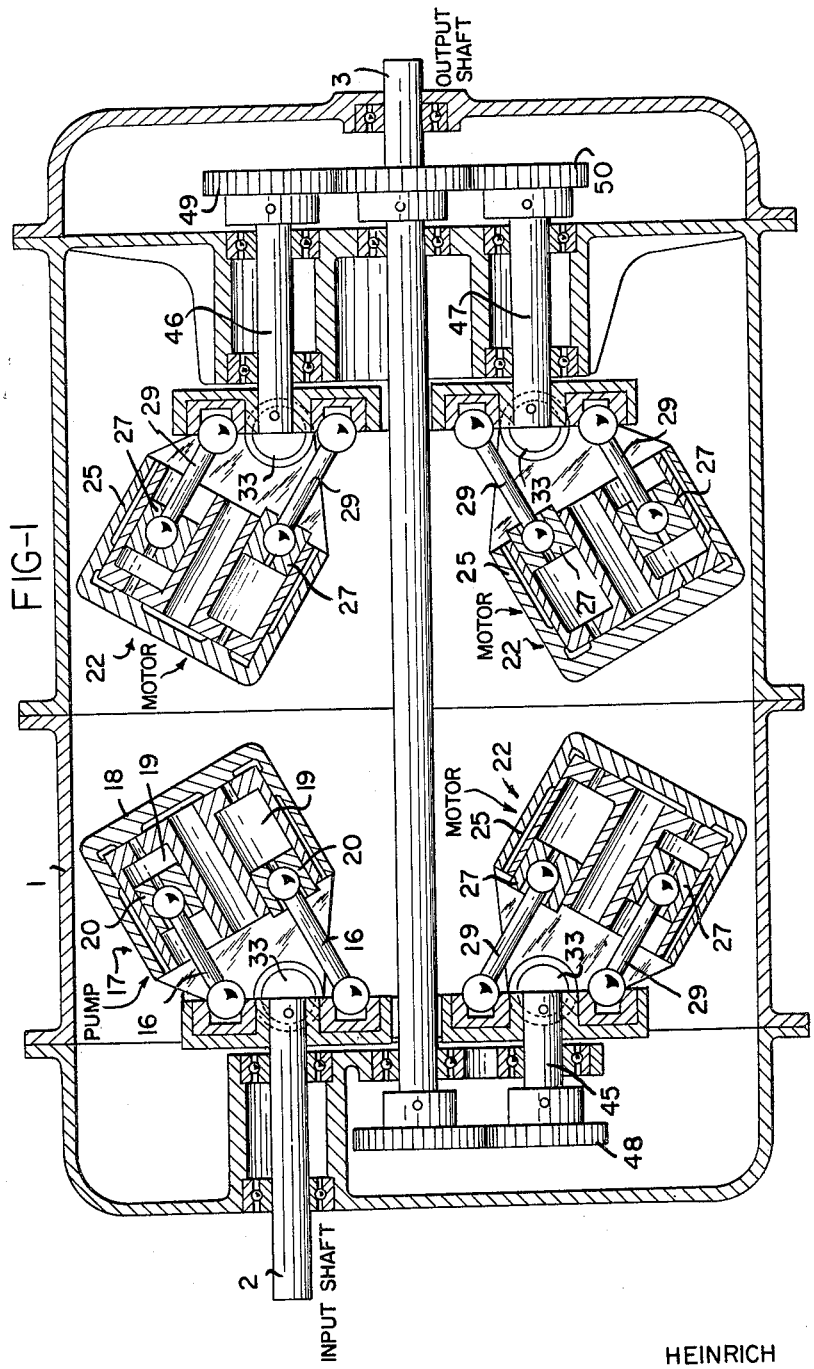
INVENTOR.
HEINRICH EBERT
BY

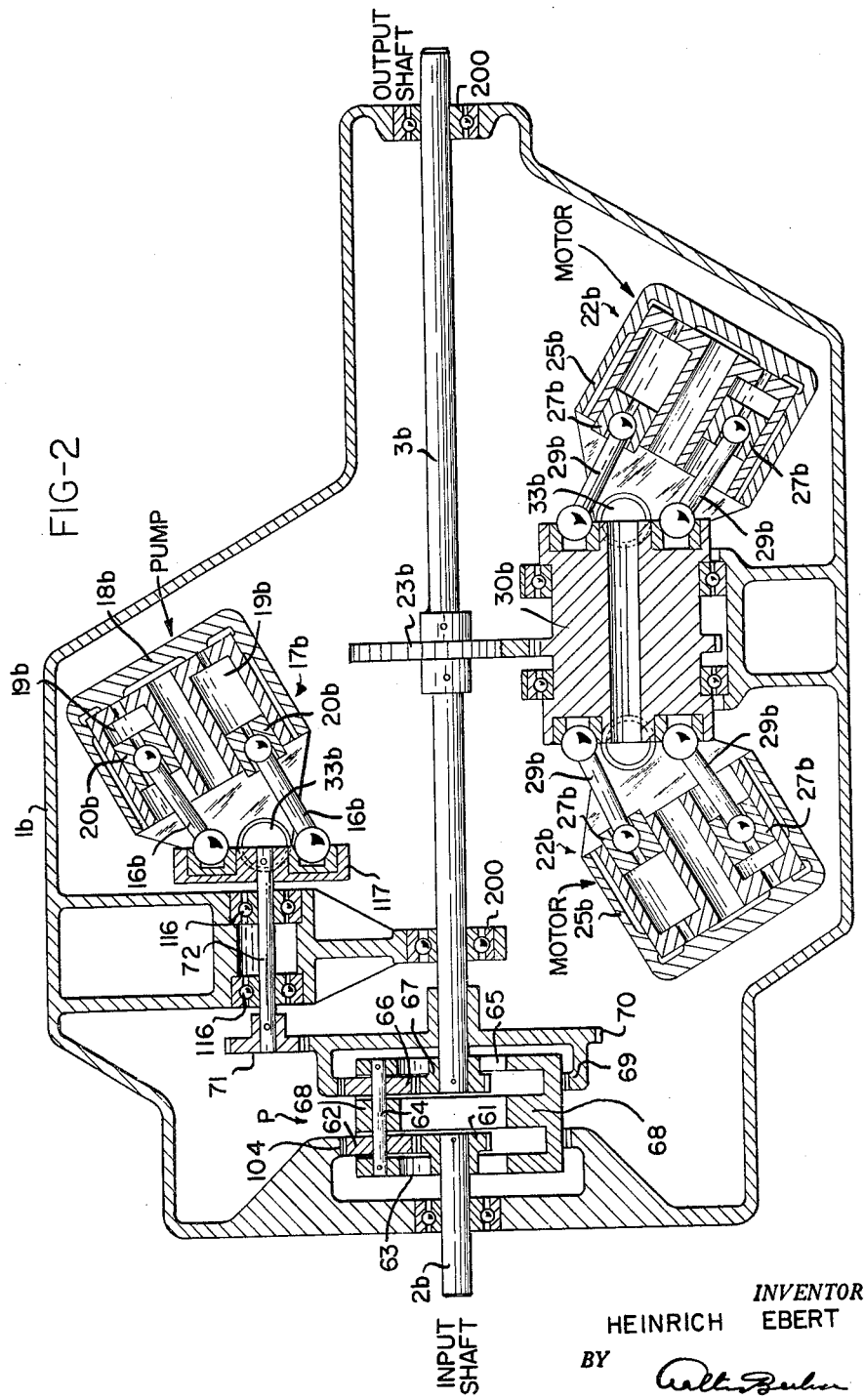

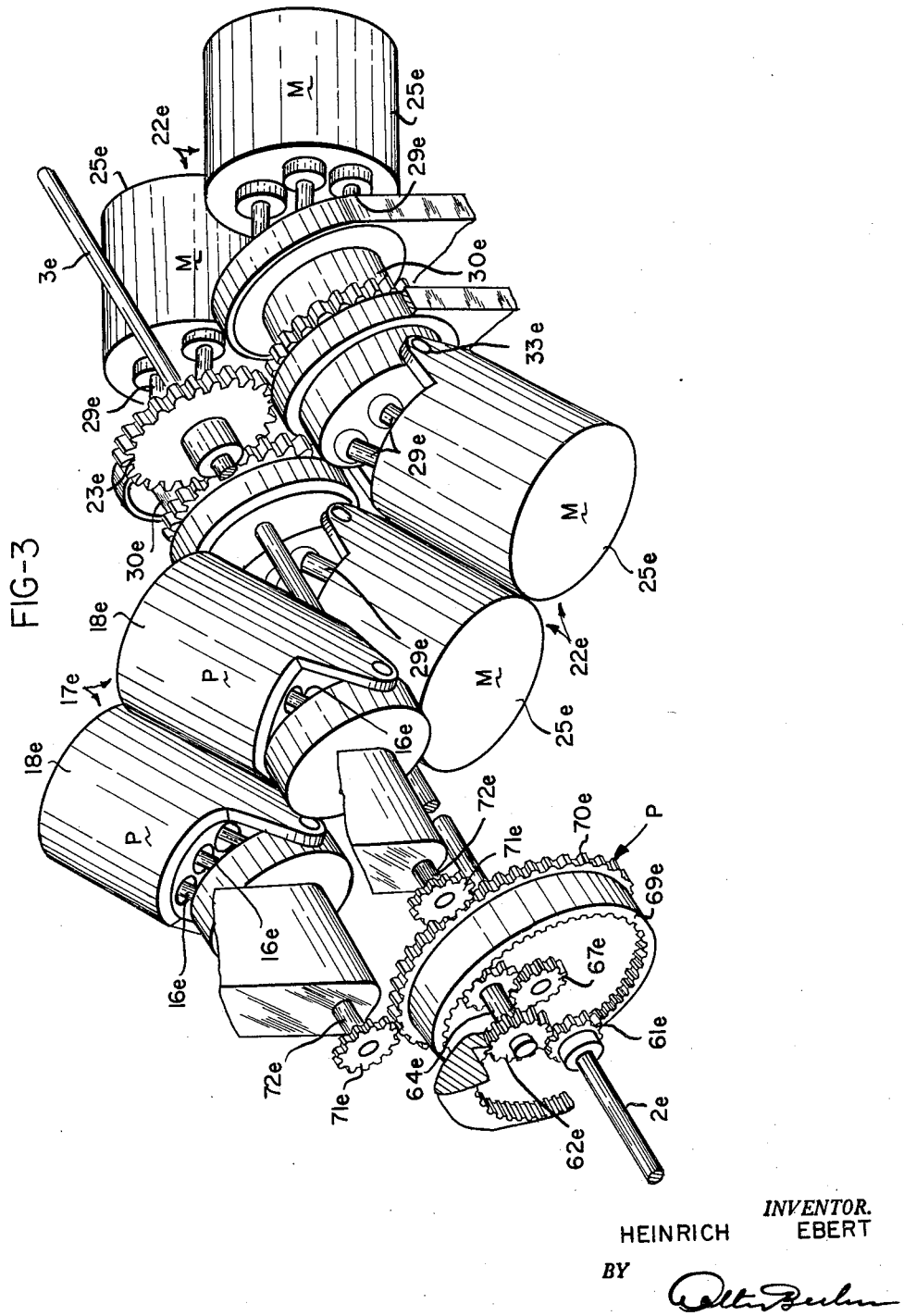

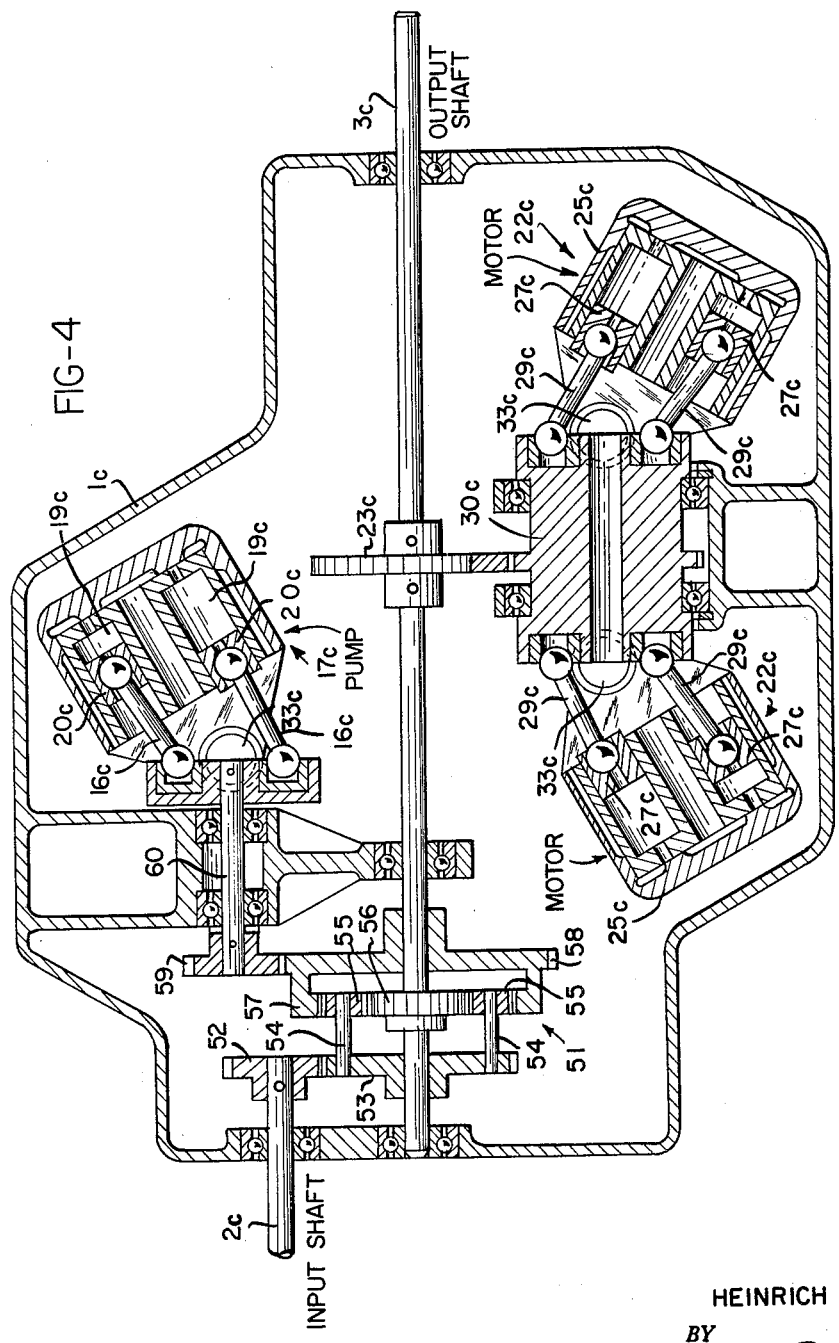

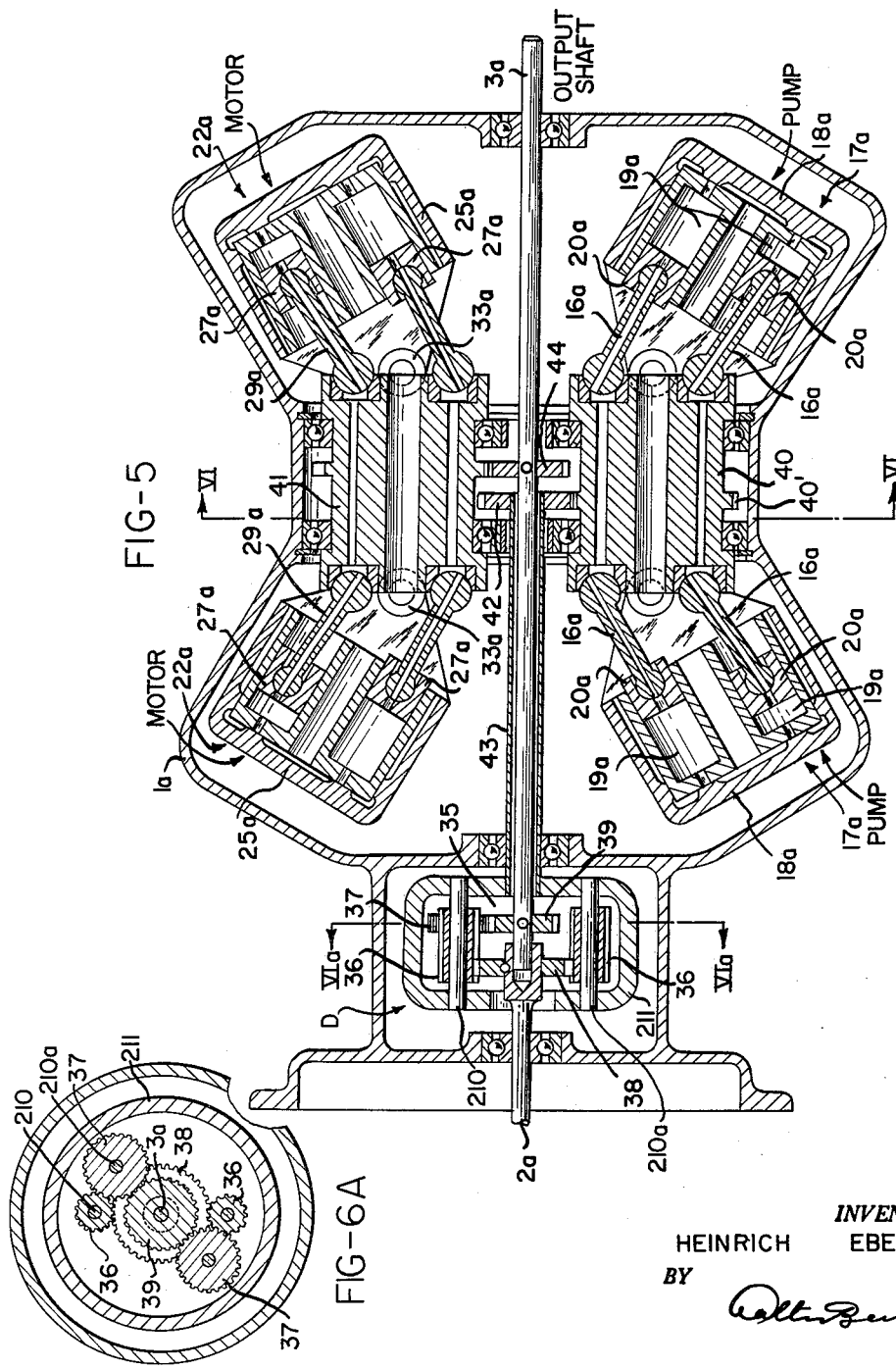

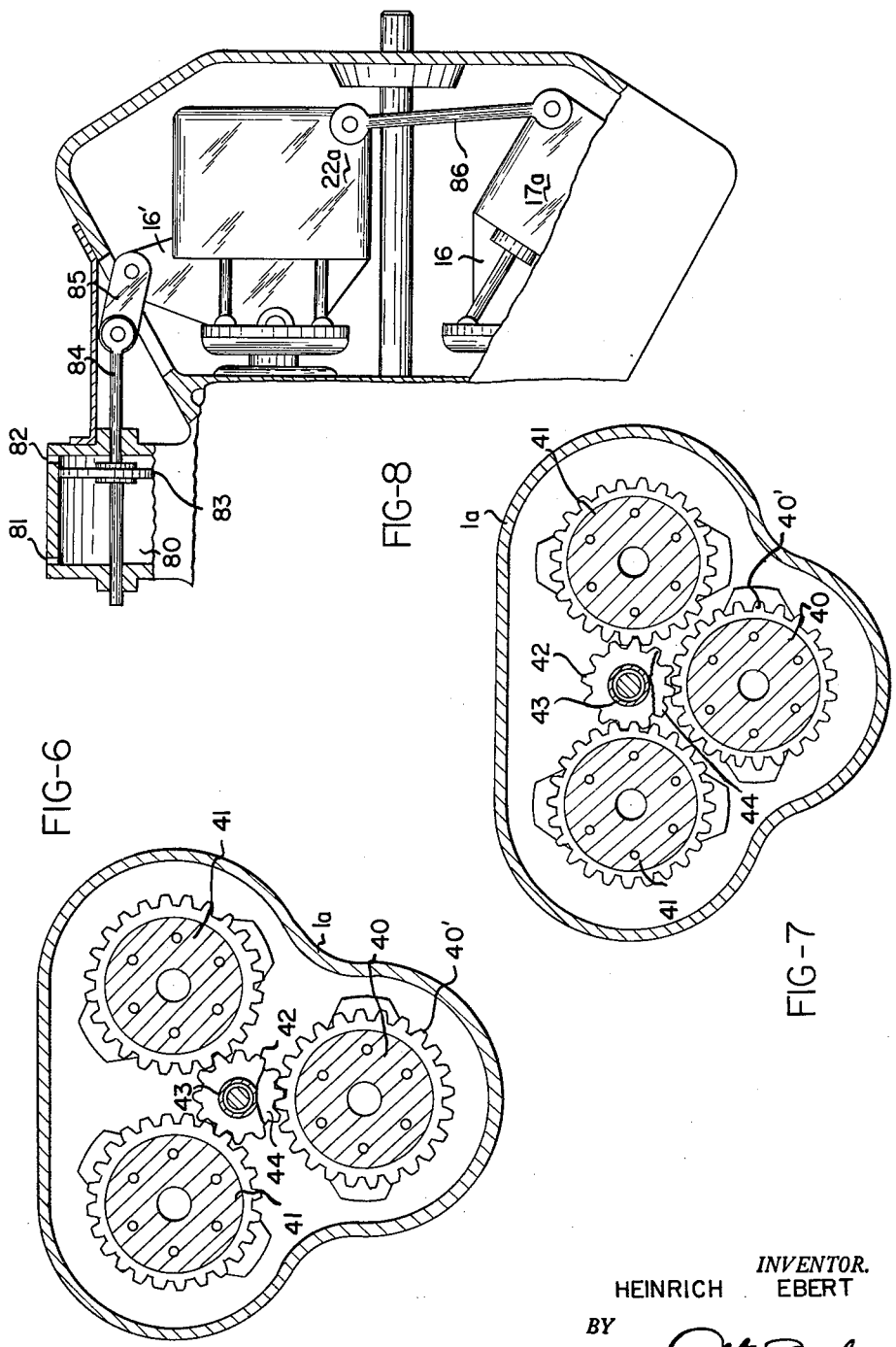

United States Patent Office 3,052,098
Patented Sept. 4, 1962

3,052,098
HYDROSTATIC AXIAL PISTON FLUID
TRANSMISSION
Heinrich Ebert, Im Weller 2, Furth, Bavaria, Germany
Filed Nov. 30, 1960, Ser. No. 72,823
Claims priority, application Germany Mar. 21, 1955
6 Claims. (Cl. 60—53)

The present invention relates to hydrostatic axial piston fluid transmissions with infinitely variable step-down or step-up ratio, especially for conveying high horsepowers over a wide torque ratio range as is required for passenger cars, heavy trucks or railroad vehicles. This is a continuation-in-part application of my copending application Serial No. 572,498, filed March 19, 1956, now abandoned.

The invention is particularly directed to those transmissions of the above mentioned type which have a hydrostatic pump and a hydrostatic motor while the pressure sides of both units communicate with each other, and in which also the suction sides communicate with each other by corresponding fluid conduits. With transmissions of this type, the adjustment of the step-down and step-up ratios is effected either by changing the delivery of the hydrostatic pump or by changing the absorption capacity of the hydrostatic motor, or by simultaneous change of both.

When employing hydrostatic piston transmissions in vehicles, it is of decisive importance to obtain a very high efficiency with a minimum of weight, with smallest dimensions and a compact construction of the transmission.

In order to obtain satisfactory degrees of efficiency, it is necessary above all to cut down leakage and compression losses as well as friction losses to a minimum. To this end, it is necessary that during the transformation of the input power into output power, the pressure of the working fluid in the transmission be held as constant as possible over the entire transmission ratio or over the entire torque ratio and that the said pressure at full load not exceed 2000 p.s.i.

A second requirement to be met to the above end consists in that the sealing surfaces of the control valves and that also the hydraulic units in general be made as small as possible.

In order to obtain a structure of a low weight, it is necessary that the hydraulic units be able to rotate at as high speeds as possible while the centrifugal forces of the pistons and the sliding speeds at the sealing surfaces between piston drum and control surfaces be kept relatively low. This in turn requires that the diameters of the piston drums be made as small as possible. The above requirements have been met according to the present invention by designing the pump units as well as the motor units as units with tiltable piston drums having axially arranged pistons which by means of connecting rods having ball-shaped ends act upon a flange which in its turn is non-rotatably connected to a shaft journalled in the transmission housing. The arrangement is furthermore such that each pump unit which is drivingly connected to the input shaft has associated therewith a plurality of motor units drivingly connected to a common output shaft.

When employing hydraulic axial piston units with tiltable cylinder drums, known per se as "Waterbury-type" units or "Thoma-type" units, it is possible over the usually employed swash plate types to employ a tilting angle which is twice as large—30°— as the customary tilting angle—15°—of swash plate type axial piston units. In this way, for one and the same torque to be transmitted at the same pressure of the working fluid, with the "Waterbury" type units sealing surfaces will be obtained which amount to only 60% of the swash plate type units, and similarly the drum diameter will amount to approximately 80% of that of the swash plate units. Thus, when conveying the same power at the same pressure of the working fluid, the "Waterbury" type units will in contrast to the swash plate type units already at the same speed of the hydraulic units have only half the friction loss at the sealing surfaces. The thereby possible increase in the speed furthermore leads to smaller units whereby the friction losses may be cut down further.

By respectively associating a plurality of motor units which are drivingly connected to a common output shaft, to a pump unit which is drivingly connected to the input shaft so that the pump units and the motor units are hydraulically interconnected, it is possible even with motor units which have the same size as the pump units, to maintain the pressure of the working fluid constant from a torque ratio 1:1 to correspondingly higher torque ratios. For purposes of further increasing the torque ratio, it is merely necessary to increase the working pressure very slightly or not to the same extent by reducing the tilting angles of the pump units.

Therefore, the hydraulic units may be designed for example for the full torque at a torque ratio 1:1 for a relatively higher fluid pressure. This means that it is possible to design each of the hydraulic units correspondingly smaller. This means further for the motor units that when they are of the same dimensions as the pump units, the motor units will be able to rotate at high speed at a transmission ratio of 1:1 without running the risk that the sliding speeds at the sealing surfaces between drum and distributor valve will reach unduly high values, and that the centrifugal forces and centrifugal moments of the piston will become unduly high. This is in clear contrast to a single large motor which otherwise would be necessary and has been customary.

According to a further development of the invention, the above mentioned hydraulic units are preceded by a differential gear transmission in which, for instance, with non-rotating output shaft, i.e. with non-rotating motors (1:00), the pump units will rotate at full speed whereas inversely with non-rotating pump units the motor units will rotate at full speed at the tilting angle zero (1:1). In this connection it may be added that the input shaft torque will, through the intervention of the differential gear transmission at each transmission ratio, be additionally purely mechanically conveyed to the output shaft. Thus, the hydrostatic units have to be employed merely for increasing the torque at step-down ratios. In addition to a torque increase at equal working pressure, an arrangement of the above mentioned type according to the invention brings about that by lowering the pump speed toward 1:1 (at 1:1=0), the friction loss in the pump unit will be considerably reduced over that of the above mentioned transmission arrangement without differential gear transmission, especially toward 1:1. Similarly, the friction losses in the motor units as they have been caused by the pistons will be reduced inasmuch as at 1:1 speed ratio the stroke of the piston will become zero.

A further improvement in the degree of efficiency will be obtained according to the invention by designing the pump units as well as the motor units as double units with two oppositely located tiltable drums of the type disclosed in my U.S. Patent 2,875,701. This improvement is possible regardless of whether the units are or are not preceded by a differential transmission.

Thus, either a single pump unit may be associated with at least one double motor unit, or a double pump unit may be associated with at least two double motor units. At any rate, by employing such double units, the friction output will be reduced further by the friction loss which would otherwise occur in view of the axial load on the individual units in the axial bearings of the shaft and which due to the mutual compensation of this axial load on the bearings becomes zero.

With the above in mind, it is, therefore, an object of the present invention to provide an axial piston transmission having a high degree of efficiency, a relatively low weight, and a relatively small size, and a compact design.

It is also an object of this invention to provide an axial piston transmission of the type set forth in the preceding paragraphs, which with a plurality of relatively small hydrostatic units will bring about an increase in the torque at the output shaft, thereby permitting higher speeds and allowing a considerable increase in the power output (torque×speed equalling power output) while simultaneously reducing the weight per horsepower.

These and other objects and advantages of the invention will appear more clearly from the following specification in connection with the accompanying drawings, in which:

FIG. 1 represents an axial section through a hydrostatic axial piston transmission according to the present invention illustrating a pump unit of the so-called "Waterbury" type which is drivingly connected to the input shaft and is hydraulically connected to three motor units of the same type, said motor units being drivingly connected to a common output shaft.

FIG. 2 is an axial section through a hydrostatic piston transmission according to the invention with a single pump unit drivingly connected to the input shaft, a double motor unit drivingly connected to a common output shaft, and a planetary differential gear system arranged at the input side of the transmission.

FIG. 3 represents a perspective view of the main elements of a hydrostatic transmission according to the invention with two pumps drivingly connected to the input shaft, two double motors drivingly connected to a common output shaft and with one differential gear transmission.

FIG. 4 is a section of a hydrostatic transmission according to the invention having one pump and two motors similar to that of FIG. 2 but with a modified differential gear transmission.

FIG. 5 is a longitudinal section through a modified hydrostatic transmission according to the invention with a double pump and two double motors and with a still further modified differential gear transmission.

FIG. 6 is a cross section along the line VI—VI of FIG. 5.

FIG. 6a is a cross section along the line VIa—VIa of FIG. 5.

FIG. 7 is a cross section through a transmission similar to that of FIG. 6 but with the difference that the axes of two double motors are located in a common plane passing through the axis of said output shaft and are arranged symmetrically with regard to said output shaft for eliminating radial loads on the shaft bearings.

FIG. 8 illustrates an adjusting system for adjusting the hydrostatic units of the transmission.

*General Arrangement*

The hydrostatic axial piston transmission according to the present invention is characterized primarily in that one or more pumps of the so-called "Waterbury" type co-operates with two or more motors of the so-called "Waterbury" type, which motors work on an output shaft common to all of said motors, the arrangement being such that the number of motors is in excess of the number of pumps.

*Structural Arrangement*

Referring now to the drawings in detail and FIG. 1 thereof in particular, the transmission according to the invention illustrated therein comprises a transmission housing 1 having journalled therein an input shaft 2 and an output shaft 3, and also one pump 17 and three motors 22. The pump and motor units are of the so-called "Waterbury" type of the customary design. More specifically, the pump comprises a tiltable housing 18 with a cylinder block 19 rotatable therein. The rotatable cylinder block has reciprocably mounted therein pistons 20. These pistons are drivingly connected by connecting rods 16 to the input shaft 2.

Similarly, each motor unit comprises a tiltable housing 25 with a rotatable cylinder block therein which latter has reciprocably mounted therein pistons 27 which are drivingly connected by corresponding connecting rods 29 to the output shaft 3.

The tiltable housing 18, 25 of each unit is, by means of a yoke connected thereto, pivotable about pivots 33. Each tiltable housing contains a control valve with kidney-shaped control grooves and fluid conduits for the pressure and suction sides as described for instance in my Patent No. 2,931,250 of April 5, 1960. The pressure sides and similarly the suction sides of said units are respectively interconnected by conduits (not shown in the drawings).

As will be evident from the drawings, the pump is directly driven by the input shaft 2, whereas the motors work through their respective shafts 45, 46 and 47 and the respective gears 48, 49 and 50 upon the common output shaft 3.

*Operation of the Device of FIG. 1*

In the position shown in FIG. 1, all units, i.e. the pump and motor units, are of the same size and are at the same tilting angle, i.e. in full stroke position. The torque acting upon the pump unit equals the torque on the input shaft. Since the dimensions and tilting angles of the motor units are the same as those of the pump unit, and since the units are hydraulically interconnected, each motor unit conveys the same torque to the output shaft so that the three motors convey together a total of three torques upon the output shaft 3, so that the total torque ratio of output shaft:input shaft is 3:1. In this position, the output shaft 3 rotates at one-third of the speed of the input shaft 2 or of the pump unit, since each of the motors receives one-third of the fluid delivered by the pump. If the tilting angle of the pump unit alone were decreased, for example to half the full stroke, the pressure of the working fluid would be doubled so that the three motors together would convey a total of six input shaft torques to the output shaft 3 with the result that the total torque ratio of output shaft to input shaft would be 6:1. In such a position, the output shaft would then rotate at one-sixth of the input shaft speed inasmuch as each of the motors would receive again one-third of the fluid delivered by the pump. It will be recalled that in the last mentioned instance the tilting angle of the pump was decreased to half of the full stroke so that consequently the quantity delivered by the pump is only half the quantity of what it would be at full stroke. Consequently, the motors and thereby the output shaft will rotate actually at one-sixth of the speed of the input shaft. When the pump is tilted beyond zero position, i.e. by a negative angle, for the same stroke, i.e. for example for a half negative stroke, the result will be the same, i.e. a torque ratio of 6:1 will be obtained at a speed ratio of 1:6 but in reverse drive.

If a torque ratio of 1:1 is desired, two motors only are tilted into zero position, which with regard to the illustration in FIG. 1 would mean into horizontal direction, whereas the pump 2 and the third motor would remain in full stroke position. Inasmuch as now the same torque acting upon the pump is transmitted only by one of the three motors to the output shaft 3, the torque ratio of output shaft to input shaft will be 1:1. Inasmuch as in these circumstances one motor only of the same size and stroke as the pump alone receives the fluid delivered by the pump, also the speed ratio of output shaft to input shaft will be 1:1.

Finally, if the two motors or one motor only are or is adjusted beyond zero position to a negative angle, the result will be an overdrive, i.e. the output shaft will rotate faster than the input shaft.

It will be appreciated that the motors will always act upon the common output shaft 3. It will also be clear from the above that an arrangement according to the present invention yields higher torque ratios at a constant pressure as well as at an increasing fluid pressure and also at full transmission power while the hydraulic units employed may be of small size and will have relatively low friction losses.

Referring now to FIG. 2, the transmission shown therein comprises a housing 1b, an input shaft 2b and an output shaft 3b journalled in the housing. Furthermore, the arrangement of FIG. 2 comprises a single pump unit 17b, two motor units 22b, and a double planetary gear system P. The drive of the transmission is effected through the input shaft 2b, pinion 61 connected thereto which latter meshes with the planetary gears 62 which in their turn mesh with the gear ring 104. Gear ring 104 is fixedly connected to the transmission housing 1b. The planetary gear wheels 62 of the first planetary gear transmission are together with the planetary gears 66 of the second planetary gear transmission rotatably journalled on stud 64, in a common planetary gear carrier 68. The planetary gear wheels 66 mesh on the inside with the sun wheel 67 which is keyed to the output shaft 3b. Furthermore, the planetary gear wheels 66 mesh on the outside with the gear ring 69 which is rotatably mounted on the output shaft 3b. Gear ring 69 is furthermore provided with outer teeth 70 meshing with the gear 71 which is connected to the pump shaft 72. Pump shaft 72 is rotatably journalled in the bearings 116 of the transmission housing 1b and is provided with a flange 117 engaged by the ball heads at the adjacent ends of the connecting rods 16b which in their turn are connected to the pistons 20b of the pump unit 17b.

The pump and motor units are of the same type as the units described in connection with FIG. 1 and corresponding parts have, therefore, been designated with the same reference numerals as in FIG. 1 but with the additional character b. The only difference between the units of FIG. 2 and those of FIG. 1 consists in that in FIG. 2 the two motors 22b are designed as a double motor unit, i.e. with two oppositely located and tiltable yokes, and cylinder blocks with counter running pistons of the type disclosed in my U.S. Patent No. 2,875,701. The common output shaft 3b is journalled in the housing by means of ball bearings 200 and is drivingly connected to said double motor unit by means of a gear 23b and shaft 30b.

The pressure sides and suction sides of the pump and the pressure and exhaust sides of the two motors (double motor unit) are interconnected by conduits not shown in the drawing in a manner well known. It is to be understood that, when the cylinder block of the pump has the same dimensions as each of the cylinder blocks of the two motors, the fluid delivery of the pump unit per revolution would equal only half the fluid absorption capacity of the two hydrostatic motors together per one revolution and at the same tilting angle.

*Operation of the Device of FIG. 2*

In the position shown in FIG. 2 all units are adjusted for the same tilting angle, i.e. full stroke position. The transmission ratio from input shaft 2b to pump drive shaft 72 is such that the torque acting upon the pump drive shaft 72 always equals the torque of the input shaft 2b, whereas the speed ratio between the input shaft 2b and the speed of the pump drive shaft 72 will depend on the speed of the output shaft 3b, i.e. on the speed of the shaft 30b of the motors. The above conditions are brought about by means of the secondary planetary gear train of the double planetary gear system which acts as a differential gear in such a way that the pump drive shaft rotates at the speed of the input shaft when the output shaft 3b and thereby the motor shaft 30b is at standstill. Inversely, the pump shaft 72 is at a standstill when the output shaft 3b and thereby the motor shaft 30b rotates at the same speed as the input shaft 2b.

From the above it will be clear that, generally spoken, the total of pump speed and motor speed always equal the input shaft speed. The actual speed ratio depends in this connection on the stroke ratio of pump stroke to motor stroke as will be explained further below. At any rate, in the position shown in FIG. 2, the torque acting upon the input shaft 2b is the same as the torque acting upon the pump drive shaft 72. Since the dimensions and tilting angles of the motor units are the same as those of the pump unit, and inasmuch as the units are hydraulically interconnected, each motor unit 22b will convey the same torque to the output shaft 3b so that the motor units together convey a total of two input torques upon the output shaft. To this is to be added a third torque which is conveyed purely mechanically from the input shaft 2b to the output shaft 3b through the double planetary gear transmission. Consequently, the total ratio of output shaft torque to input shaft torque is 3:1. In this position, the output shaft 3b rotates at ⅓ of the speed of the input shaft 2b whereas the pump shaft will rotate at ⅔ of the speed of the input shaft 2b. Consequently, the quantity of fluid delivered by the pump 18b is ⅔ of the quantity which would be delivered by the pump if the latter would rotate at the speed of the input shaft. Under this condition and since each of the motors 22b receives one-half of the fluid delivered by the pump 18b, the quantity of fluid received by each motor will be one-third of what the pump would deliver if the pump would rotate at the same speed as the input shaft. Thus, the motors rotate at one-third of the speed of the input shaft, and inasmuch as they are drivingly connected to the output shaft at a 1:1 ratio, they will rotate the output shaft at one-third of the speed of the input shaft so that at a ratio of output shaft speed to input shaft speed of 1:3 (in this instance brought about by the differential gear transmission P) the ratio of output shaft torque to input shaft torque will be 3:1. If the ratio of output speed to input speed is to be made less than 1:3, for instance 1:4, the pump is to be tilted in the direction toward zero stroke position whereby the fluid pressure in the pump unit and thereby also in the motor units increases while the fluid delivery decreases correspondingly. Thus, with the above assumed example, the output ratio to the input torque ratio will be 4:1, and the output speed ratio to the inuput speed ratio will be 1:4. When tilting the pump beyond zero stroke position to negative tilting angles, the result will be an overdrive, i.e. the output shaft rotates faster than the input shaft. It will be understood that the motors will always act upon the common output shaft.

As will be seen from the above, the purpose of the arrangement according to FIG. 2 is the same as that of the arrangement according to FIG. 1, namely to yield higher torque ratios at a constant pressure of the transmission fluid as well as at an increasing fluid pressure, especially at full transmission power, while employing hydraulic units which are of relatively small size, have less friction losses and are of the same dimensions. In this way, the units can rotate at speeds as high as possible whereby the weight of such transmissions may be considerably reduced. The number of motor units is in excess of the number of pump units.

The advantage of the arrangement according to FIG. 2 over that of FIG. 1 consists primarily in that by having the pump preceded by a double planetary gear transmission, the second planetary gear train of which acts as a differential transmission, it is possible at the same fluid pressure to obtain the same torque increase by means of less hydraulic units, for instance by means of three hydraulic units instead of the four hydraulic units of FIG. 1. Moreover, the friction losses may be further reduced inasmuch as under the same conditions of operation with regard to the power to be conveyed at the same input speed and transmission ratio, the pump has to work at lower speed, and the motors have to work with shorter piston strokes which means that the entire transmission works with considerably less friction losses. Thus, for instance, at a transmission ratio 1:1, the pump will stand still, whereas the motors will operate with the stroke zero, whereas with the arrangement of FIG. 1, for instance at the same transmission ratio of 1:1, the pump and also the third motor will have to rotate at a speed equalling the input speed at full piston stroke.

A further reduction in the friction losses and thereby an increase in the efficiency is obtained by the employment of double counteracting units because the axial loads on the axial bearings of the shafts as caused by the considerable axial forces of one unit are balanced and thus are made ineffective by the oppositely working individual unit.

FIG. 3 illustrates a transmission which is very similar to that of FIG. 2 with the exception that instead of one pump and one double motor there are used two single pumps 17e and two double motors 22e, i.e. two pump units and four motor units. The arrangement is furthermore such that each pump unit 17e is driven by a single double planetary gear transmission P in a way similar to that illustrated in FIG. 2 and each double motor is drivingly connected to the common output shaft 3e.

FIG. 4 illustrates a transmission which, hydraulically seen, has precisely the same arrangement as FIG. 2. The only difference consists in that instead of the double planetary gear transmission of FIG. 2, the arrangement of FIG. 4 uses only the second planetary gear train acting as a differential gear transmission in the same way, whereas the first planetary gear train shown in FIG. 2 and acting only as a normal gear transmission has been replaced by a normal two-gear transmission in such a way that the transmission ratio between the input shaft 2c and the planetary gear carrier 53 of the second gear train is precisely the same as in the arrangement according to that of FIG. 2. In view of the above changes, the input shaft 2c is not coaxial with the output shaft 3c.

Referring now to FIGS. 5 and 6, the hydrostatic transmission shown therein differs from that of FIG. 2 primarily in that instead of comprising one single pump unit and two motor units arranged as a double motor, it comprises one double pump 17a, 17a and two double motors 22a, 22a, only shaft 41 of one double motor being shown in FIG. 5 but both shafts 41 of the two double motors being shown in FIG. 6. Thus, the arrangement of FIG. 5 comprises two pump units 17a and four motor units 22a, all of said units being the same in design namely of the so-called "Waterbury" type. Inasmuch as the pump and motors correspond in their construction in principle to those of FIGS. 1 and 2, (see also my above mentioned U.S. Patent No. 2,875,701) a detailed description of the pumps and motors appears to be superfluous. Corresponding parts have been numbered as in FIGS. 1 and 2 but with the additional affix a.

A further structural difference between the arrangement of FIGS. 2 and 4 and the arrangement of FIG. 5 consists in the planetary gear transmission itself. In contrast to the double planetary gear transmission of FIG. 2, and in contrast to the gear transmission of FIG. 4, the planetary gear system of FIG. 5 represents a purely differential gear transmission with the same effect as for instance the double planetary gear system of FIG. 2, i.e. in reducing the total of speeds of the pump and of the motor as described in the preceding paragraphs. The differential gear transmission generally designated D consists primarily of the sun wheel 38 connected to the input shaft 2a and the sun wheel 39 connected to the output shaft 3a, the planetary gear set 36 meshing with the sun wheel 38, and the planetary gear set 37 meshing with the sun wheel 39. The planetary gears of the one set mesh with the planetary gears of the other set in the plane of the smaller sun wheel 39. The planetary gears 36, 37 are respectively rotatably mounted on bolts 210 and 210a in the differential housing or planetary gear carrier 211. Housing 211 is drivingly connected to the pinion 42 by means of a hollow shaft 43 arranged coaxially with regard to the output shaft 3a. The pinion 42 meshes with the gear 40' of shaft 40 common to the two pumps 17a. In contrast to the planetary gear transmissions described above in connection with other hydrostatic transmissions of the invention, the gear transmission D has no gear ring with inner teeth.

It may also be added that while according to FIG. 2 the direction of rotation of the output shaft 3b is the same as the direction of rotation of the input shaft 2b, with the arrangement of FIG. 5, the direction of rotation of the output shaft 3a is opposite to the direction of rotation of the input shaft 2a with regard to the forward drive of the transmission.

The arrangement of FIG. 7 corresponds to that of FIG. 6 with the exception that the axes of the shafts 41 of the two double motors are located in a common plane passing through the axis of the output shaft. In this way, the radial load on the bearings for the output shaft is relieved.

While the tilting control of the pump and motor units is known per se, a brief reference thereto may be made while referring to FIG. 8 showing one way of effecting such tilting operation, for instance for the arrangement of FIG. 5. As will be seen from FIG. 8, the housing 1 has connected thereto a cylinder 80 with fluid passages 81 and 82 which communicate with a valve (not shown) through which actuating fluid may be admitted to and withdrawn from cylinder 80 to reciprocate a piston 83 reciprocably mounted in cylinder 80. Piston 83 has connected thereto the connecting rod 84 which latter by means of a link 85 is linked to a bracket or yoke 16' connected to the housing of the unit 22a. The unit 22a in its turn is connected through a link 86 with the unit 17a which in its turn, through a bracket or yoke 16, is linked to pivot 33a (see FIG. 5). It will thus be seen that when piston 83 is moved in one or the other direction, it will through link 85 and bracket 16' tilt the unit 22a and thereby through link 86 also tilt the unit 17a.

It is, of course, to be understood that the present invention is, by no means, limited to the particular constructions shown in the drawings but also comprises any modifications within the scope of the appended claims.

Thus, it is within the scope of the present invention to have the pump or output shaft driven from another member of the planetary gear transmission as described above. Similarly, a hydrostatic transmission according to the invention is not limited to the employment of a differential gear transmission but may also be used without the same as shown in FIG. 1. In such an instance, the pump would be driven directly, and the output would be purely hydraulically transmitted by a plurality of motors which are drivingly connected to a common output shaft.

What I claim is:

1. In combination in an infinitely variable hydrostatic axial piston transmission having at least one variable hydrostatic pump unit and having at least two hydrostatic motor units: an input shaft drivingly connected to at least one pump unit, and an output shaft common to and drivingly connected to all of said motor units, the pressure sides of said pump and motor units being hydraulically connected to each other and the suction side of said pump and exhaust sides of said motor units being hydraulically connected to each other, said pump and motor units being of the so-called Waterbury type and being provided with tiltable cylinder blocks, the number of said motor units being in excess of the number of said pump units.

2. In combination in an infinitely variable hydrostatic axial piston transmission having at least one variable hydrostatic pump unit and at least two variable hydrostatic motor units: an input shaft, an output shaft, differential gear means having a first element drivingly connected to said input shaft and having a second element drivingly connected to at least one pump unit for driving the latter, said differential gear means also including a third element drivingly connected to said output shaft, additional gear means drivingly connected to said output shaft and also drivingly connected to each of said motor units to thereby establish driving connection of each of said motor units with said output shaft, the pressure sides of said pump unit and motor units and the suction side of said pump and exhaust sides of said motor units respectively being hydraulically interconnected, said pump and motor units being of the Waterbury type and being provided with tiltable cylinder blocks, the number of said motor units being in excess of the number of said pump units.

3. In combination in an infinitely variable axial piston transmission: a housing, at least one hydrostatic variable pump unit mounted in said housing, at least two hydrostatic variable motor units mounted in said housing and hydraulically connected to said pump unit, said pump and said motor units being of the Waterbury type and being provided with tiltable cylinder blocks, an input shaft drivingly connected to said pump unit, and an output shaft common to and having permanently drivingly connected thereto all of said motor units, the number of said motor units being in excess of the number of said pump units.

4. In combination in an infinitely variable hydrostatic axial piston transmission: a housing, at least one hydrostatic variable pump unit mounted in said housing, at least two variable hydrostatic motor units mounted in said housing and hydraulically connected to said pump unit, said pump and motor units being of the Waterbury type and being provided with tiltable cylinder blocks, an input shaft, an output shaft, differential gear means comprising a first element drivingly connected to said input shaft and having a second element drivingly connected to said pump unit for driving the latter, said differential gear means also comprising a third element drivingly connected to said output shaft, said output shaft being common to and drivingly connected to all of said motor units, the number of said motor units being in excess of the number of said pump units.

5. An arrangement according to claim 1, in which said motor units form at least one double motor.

6. An arrangement according to claim 1, in which the axes of at least two motor units are arranged symmetrically to the output shaft along a plane passing through the axes of said motors and said output shaft.

References Cited in the file of this patent

UNITED STATES PATENTS

| | | |
|---|---|---|
| 1,277,055 | Kellogg | May 22, 1917 |
| 2,103,530 | Henry | Dec. 28, 1937 |

FOREIGN PATENTS

| | | |
|---|---|---|
| 241,234 | Great Britain | Oct. 12, 1925 |